US007073837B2

United States Patent
Madlinger

(10) Patent No.: US 7,073,837 B2
(45) Date of Patent: Jul. 11, 2006

(54) MULTI-PURPOSE TAILGATE FOR A VEHICLE

(76) Inventor: David L. Madlinger, 1845 W. Dawson Rd., Milford, MI (US) 48380

( * ) Notice: Subject to any disclaimer, the term of this patent is extended or adjusted under 35 U.S.C. 154(b) by 55 days.

(21) Appl. No.: 11/008,469

(22) Filed: Dec. 9, 2004

(65) Prior Publication Data
US 2006/0125270 A1   Jun. 15, 2006

(51) Int. Cl.
B62D 25/00    (2006.01)
(52) U.S. Cl. .................................... 296/57.1; 296/62
(58) Field of Classification Search ............. 296/57.1, 296/62; 280/164.1
See application file for complete search history.

(56) References Cited

U.S. PATENT DOCUMENTS

| | | | | |
|---|---|---|---|---|
| 2,391,813 | A * | 12/1945 | Wood | 296/61 |
| 2,527,818 | A * | 10/1950 | Ives | 414/557 |
| 2,683,540 | A * | 7/1954 | Wood | 414/557 |
| 2,820,554 | A | 1/1958 | Vogel et al. | |
| 3,305,112 | A * | 2/1967 | Brown | 414/557 |
| 3,416,677 | A | 12/1968 | Abfalter | |
| 3,637,097 | A * | 1/1972 | Horowitz | 414/557 |
| 3,968,890 | A | 7/1976 | Robson | |
| 4,180,143 | A * | 12/1979 | Clugston | 280/166 |
| 4,787,809 | A * | 11/1988 | Zrostlik | 414/557 |
| 4,813,842 | A * | 3/1989 | Morton | 296/57.1 |
| 5,312,150 | A | 5/1994 | Quam | |
| 5,641,262 | A | 6/1997 | Dunlop et al. | |
| 5,788,311 | A * | 8/1998 | Tibbals | 296/62 |
| 6,648,579 | B1 * | 11/2003 | Vartanian, Sr. | 414/546 |
| 6,893,203 | B1 * | 5/2005 | Anderson et al. | 414/557 |
| 6,966,597 | B1 * | 11/2005 | Tegtmeier | 296/57.1 |
| 6,976,820 | B1 * | 12/2005 | Sandy | 296/62 |
| 2002/0197142 | A1 | 12/2002 | Anderson et al. | |

* cited by examiner

Primary Examiner—Kiran B. Patel
(74) Attorney, Agent, or Firm—Dierker and Associates, P.C.

(57) ABSTRACT

A multi-purpose tailgate for a vehicle. The tailgate includes a multiple link mechanism operatively attaching the tailgate to the vehicle body. The link mechanism articulates the tailgate from a closed position into first and second open positions. First and second opposed spring assemblies operatively connect the tailgate to the link mechanism and the link mechanism to the vehicle body, respectively. Cables (adapted to support a predetermined weight) operatively attach the vehicle to the link mechanism and to the tailgate. First and second latch mechanisms are operatively defined in opposed sides of the tailgate/link mechanism and in respective adjacent areas of the vehicle body. The first latch mechanism is adapted to selectively open/close the tailgate. The second latch mechanism is adapted to selectively allow the link mechanism to articulate so as to move the tailgate between the two open positions. The first open position is adapted for access to a cargo area, and the second open position is adapted for use as a step into the cargo area.

15 Claims, 5 Drawing Sheets

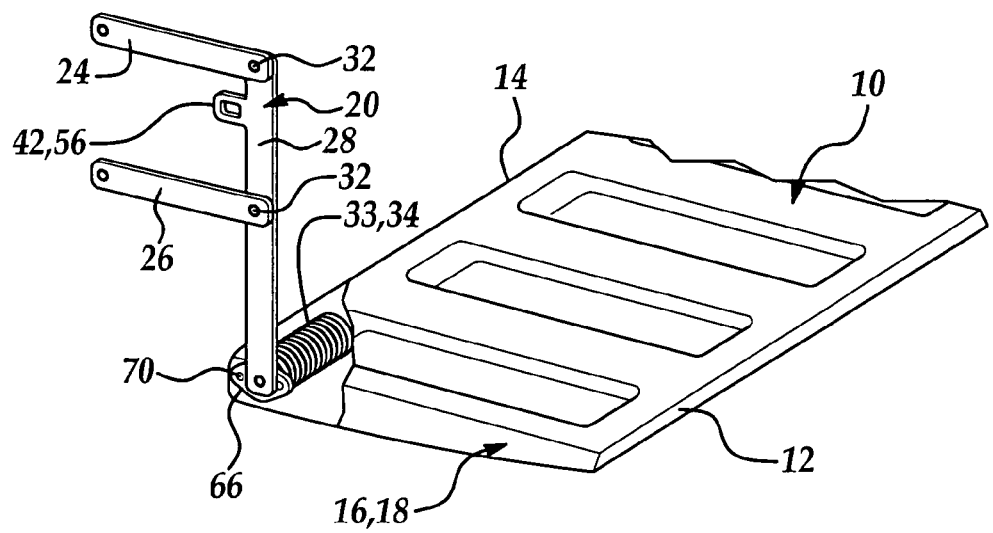
*Figure 8*
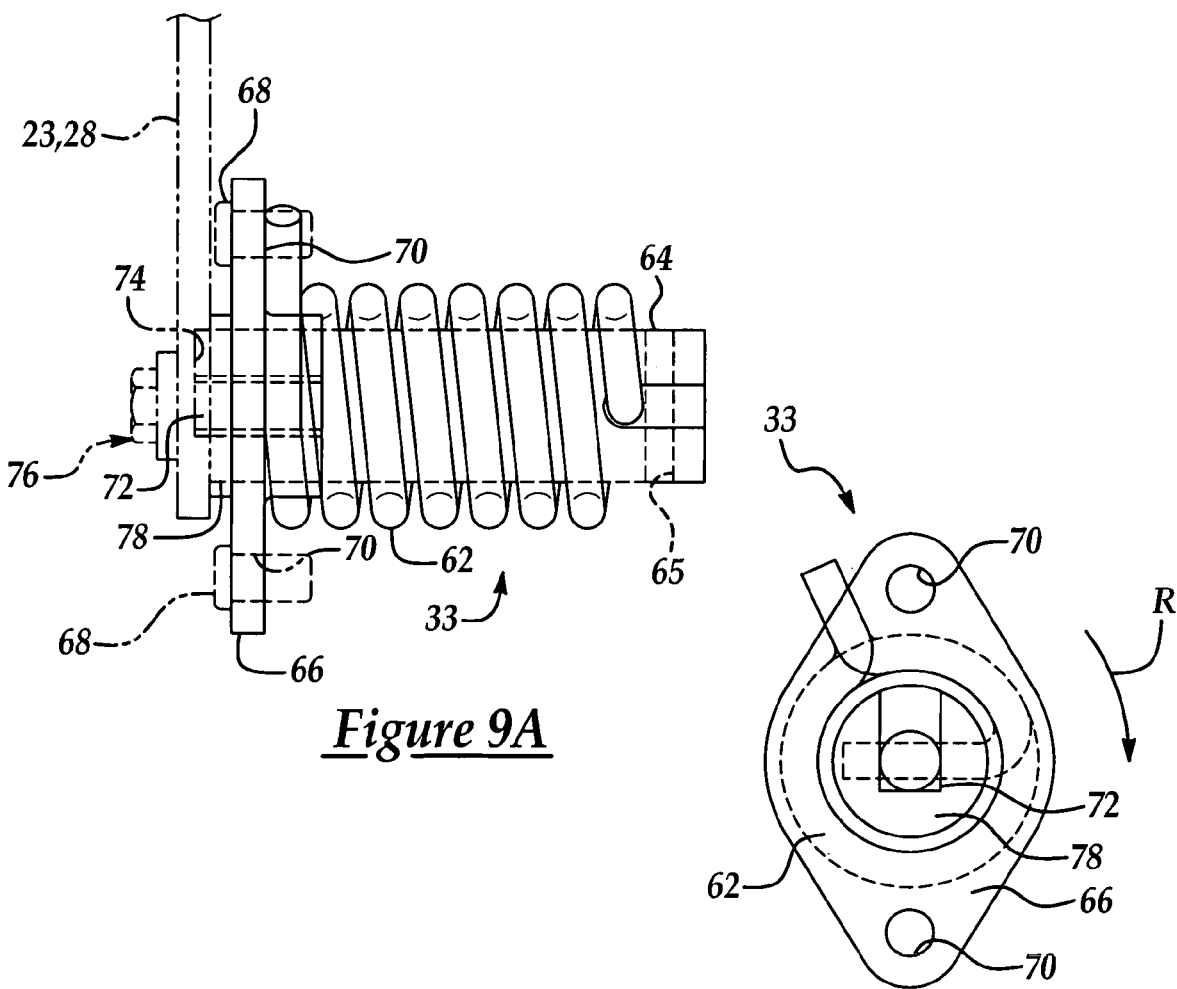
*Figure 9A*
*Figure 9B*

MULTI-PURPOSE TAILGATE FOR A VEHICLE

BACKGROUND

The present disclosure relates generally to tailgates, and more particularly to a multi-purpose tailgate for a vehicle.

Typical vehicle tailgates are movable between two positions—open and closed. These tailgates, when in the open position, are generally high off of the ground because they are level with the cargo area of the vehicle. This may, in some instances, make it difficult for a person or animal to get into the cargo area of the vehicle.

The use of a step mounted on a vehicle is generally known. However, proposed tailgate steps have been built into the existing tailgate (i.e. the existing tailgate has been modified significantly), and/or are complex and costly devices that are mounted to the existing tailgate and/or replace the existing tailgate. In some instances, these proposed tailgate steps, when not in use, occupy some of the cargo area, thereby substantially decreasing available storage space in the cargo area. In other instances, these proposed tailgates may include many additional, heavy materials, thus undesirably adding to the weight and bulk of the existing tailgate.

Thus, it would be desirable to provide a multi-purpose tailgate for a vehicle that does not occupy substantial space in the cargo area. Further, it would be desirable to eliminate excess additional materials from such a multi-purpose tailgate, as well as excess weight and bulk associated therewith.

SUMMARY

Embodiment(s) of the multi-purpose tailgate include a top region, a bottom region, and opposed side regions. The tailgate includes a multiple link mechanism operatively attaching the tailgate to the body. The multiple link mechanism is adapted to articulate the tailgate from a closed position into a first open position, and a second open position vertically spaced apart from the first open position. A set of opposed spring assemblies operatively connects the bottom region of the tailgate to the link mechanism, while a second set of opposed spring assemblies operatively connects the link mechanism to the vehicle body. At least two opposed cables operatively attach the vehicle to the link mechanism and to the tailgate, and the cables are adapted to support a predetermined weight. A latch mechanism is operatively defined in the opposed sides of the tailgate and in respective adjacent areas of the vehicle body. The latch mechanism is adapted to selectively attach the tailgate to the vehicle body. A second latch mechanism is operatively disposed in the link mechanism and in respective adjacent areas of the vehicle body. The second latch mechanism is adapted to selectively allow the link mechanism to articulate so as to move the tailgate between the two open positions. The first open position is adapted for access to a cargo area, and the second open position is adapted for use as a step into the cargo area.

BREIF DESCRIPTION OF THE DRAWINGS

Objects, features and advantages will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

FIG. 8 is a cutaway, semi-schematic perspective view of an alternate embodiment of the tailgate and the link mechanism;

FIG. 9A is an enlarged front view of an alternate embodiment of a spring assembly, the spring assembly attachment shown in phantom; and FIG. 9B is a front view of the spring assembly of FIG. 9A.

DETAILED DESCRIPTION

It has been unexpectedly and fortuitously discovered that using an existing vehicle tailgate as a step may advantageously allow a user or an animal to gain access to the cargo area of the vehicle without having additional complex devices formed in and/or attached to the tailgate that may add undesirable weight or bulk to the tailgate, or that may undesirably occupy storage area in the vehicles' cargo space. Embodiment(s) of the tailgate may be used as, but is not limited to, a step into the cargo area.

Figure 1:
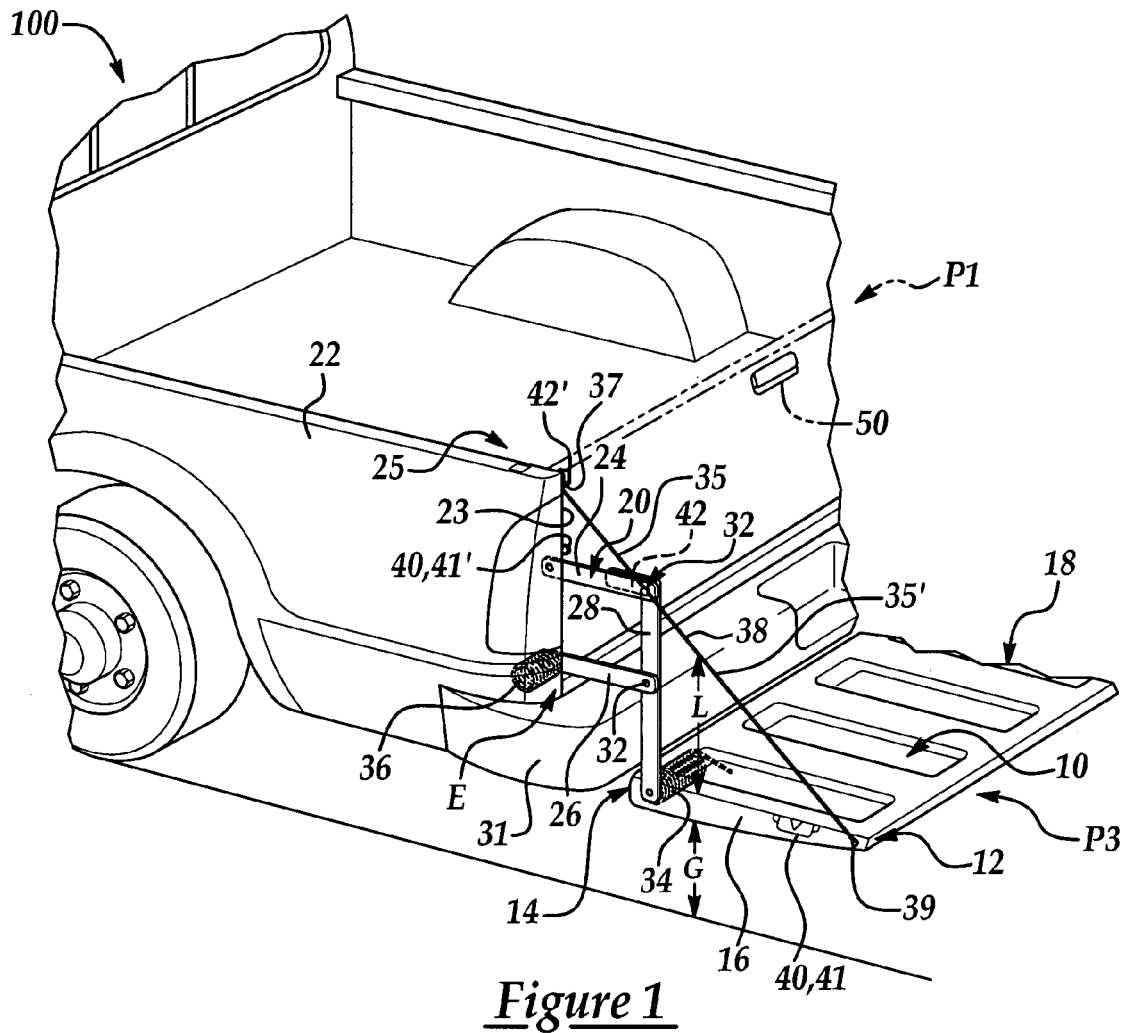
FIG. 1 is a cutaway, semi-schematic perspective view of an embodiment of the vehicle and the tailgate.

Referring now to FIG. 1, an embodiment of the vehicle 100 has its original equipment tailgate 10 attached thereto. FIG. 1 shows the tailgate 10 closed (in phantom) and in the second open position (described more fully herein). The tailgate 10 generally includes a top region 12, a bottom region 14, and two opposed side regions 16, 18 (side 18 is not shown, but generally depicted at the cutaway break of the tailgate). It is to be understood that the opposed sides 16, 18 of tailgate 10 and associated link mechanisms, spring assemblies, etc. (as described hereinbelow) are mirror images of each other (as such, one side is shown, but not the other for the sake of simplicity).

Figure 5:
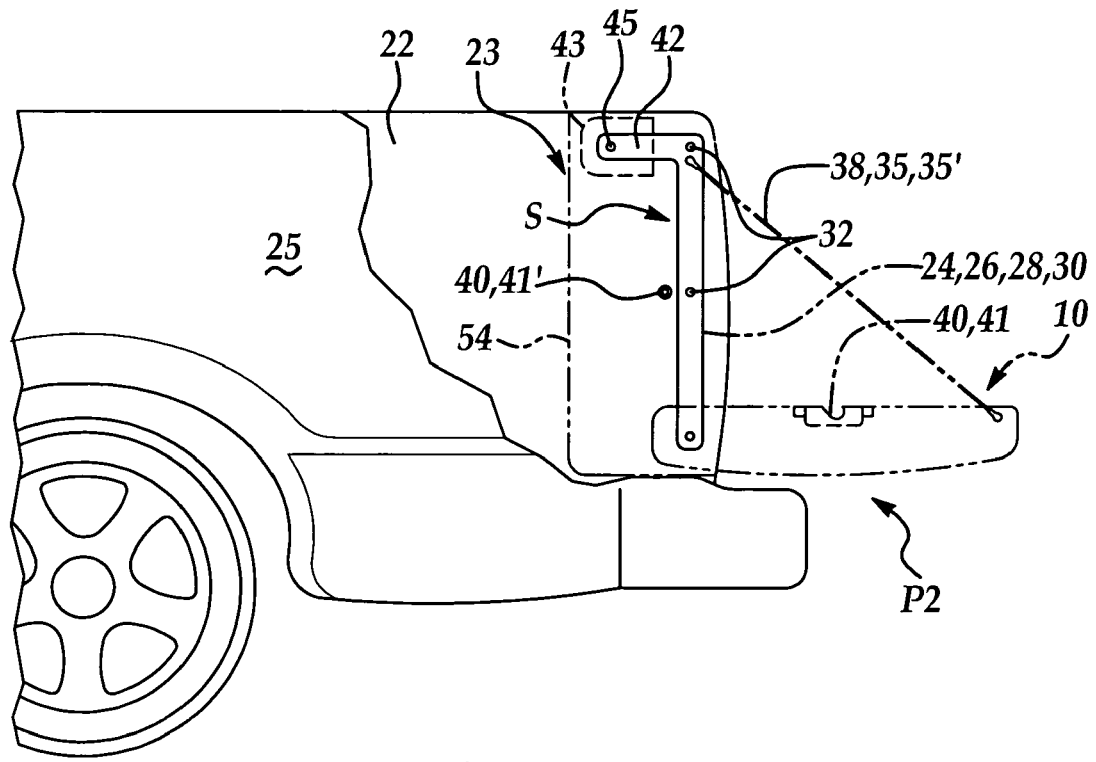
FIG. 5 is a cut-away, semi-schematic side view of an embodiment of the tailgate (shown in phantom) in the first open position.
Figure 6:
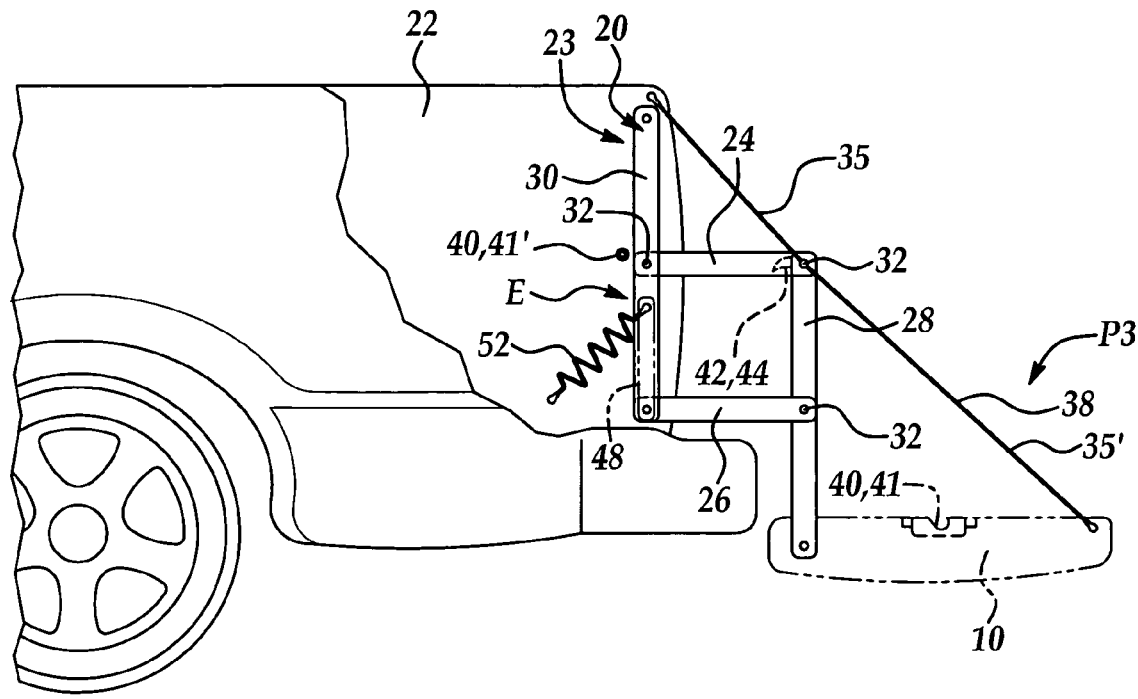
FIG. 6 is a cut-away, semi-schematic side view of an embodiment of the tailgate (shown in phantom) in the second open position.

A multiple link mechanism 20 operatively attaches the tailgate 10 to the body 22 of the vehicle 100 such that the tailgate 10 is articulatable between a closed position P1 (shown in FIG. 4) and a first open position P2 (shown in FIG. 5) or a second open position P3 (shown in FIGS. 1 and 6). As mentioned above, while only one link mechanism 20 is shown in the Figures, it is to be understood that two link mechanisms 20 operatively attach the opposed side regions 16, 18 of the tailgate 10 to respective adjacent side regions of the vehicle body 22.

An embodiment of the link mechanism 20 includes a first bar 24, a second bar 26, and a third bar 28. The inside end region 23 of the body cargo area 25 to which bars 24 and 26 pivotally attach may serve as a fourth bar. It is to be understood that end region 23 may be any region suitable for connection with the link mechanism 20 while allowing mechanism 20 to operatively articulate. In an alternate embodiment, the link mechanism 20 may include a separate fourth bar 30 (shown in FIG. 6). Although a four bar link mechanism 20 is described herein, it is to be understood that any number of links may form the multiple link mechanism 20, as desired and/or as desirable for a specific end use.

It is to be understood that the link mechanism 20 is adapted to move between a stowed position S (shown in FIGS. 4 and 5) and an extended position E (shown in FIGS. 1 and 6). It is to be understood that when the link mechanism 20 is in the stowed position S, the tailgate 10 is either in the closed position P1 or the first open position P2, and the link mechanism 20 is collapsed such that the bars 24, 26, 28 (and optionally, 30) may be substantially in line with each other (e.g. at the inside end region 23 of the body cargo area 25 of the vehicle 100). It is to be further understood that when the link mechanism 20 is in the extended position E, the tailgate 10 may be in the second open position P3, and the first and second bars 24, 26 are substantially parallel to and spaced apart from each other, and are substantially perpendicular to the third bar 28 and to the inside end region 23 (and/or fourth bar 30, if used). Still further, it is to be understood that the bars 24, 26, 28 (30) may be any suitable length and/or width sufficient to articulate the tailgate 10 to the desired second open position P3, i.e. to a position P3 whereby the tailgate 10 desirably clears the vehicle bumper 31 and is spaced a desired distance G from the ground.

A means 32 is provided for operatively connecting the bars 24, 26, 28 (30, when used) to each other so that they may pivot and/or rotate to articulate the link mechanism 20 between the stowed S and extended E positions. A non-limiting example of the means 32 for operatively connecting the bars 24, 26, 28 (30) together includes, but is not limited to step pins.

The link mechanism 20 is attached to the inside end region 23 of the vehicle body 22. In an embodiment, the link mechanism 20 is attached to the inside 23 via the first and second bars 24, 26, such that the link mechanism 20 is moveable between the stowed S and extended E positions. In an alternate embodiment (shown in FIG. 6), the link mechanism 20 is attached to the inside 23 of the body 22 via the fourth bar 30. The fourth bar 30 may be securely attached to the body 22 by any suitable fastening means.

Figure 2:
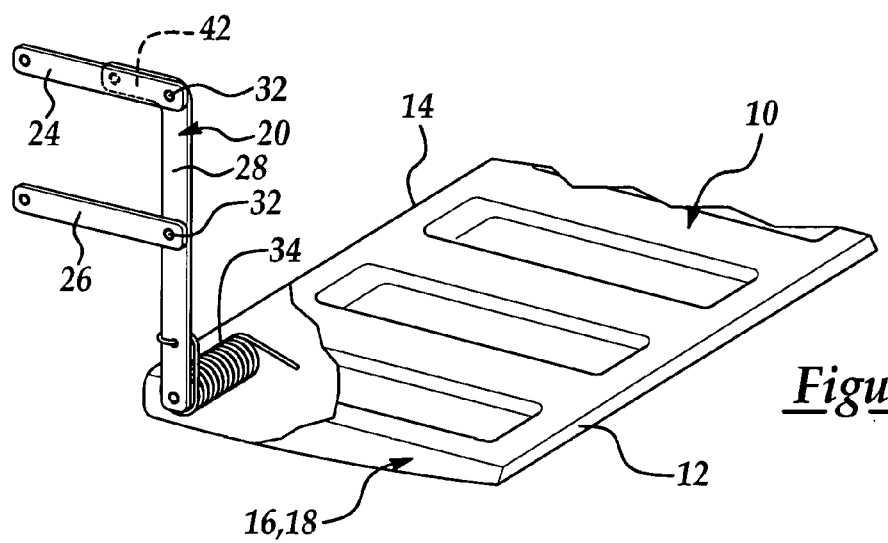
FIG. 2 is a cutaway, semi-schematic perspective view of an embodiment of the tailgate and the link mechanism.

It is to be understood that the third bar 28 of the link mechanism 20 may be operatively connected to a side region 16, 18 of the tailgate 10. As shown in FIGS. 1 and 2, the connection of the tailgate 10 to the link mechanism 20 may be near the bottom region 14 of the tailgate 10. In an embodiment, a set of optional spring assemblies 34 (located near the opposed side regions 16, 18) operatively connects the tailgate 10 to the link mechanism 20. As depicted more clearly in FIG. 2, the spring assembly 34 is connected to both the tailgate 10 and the link mechanism 20 (e.g. via the third bar 28). Without being bound to any theory, it is believed that the addition of this spring assembly 34 may advantageously substantially reduce (in comparison to a tailgate with additional mechanisms/devices incorporated therewith) or maintain (in comparison to an original, unmodified tailgate 10) the effort needed to move the tailgate 10 from its first open position P2 to the closed position P1.

Suitable examples of the set of spring assemblies 34 include, but are not limited to torsion springs, torsion tubes, torsion bars, compression springs, extension springs, helical springs, flat springs, and/or elastomeric springs, and/or the like.

Referring back to FIG. 1, a second set of spring assemblies 36 operatively connects the link mechanism 20 to the vehicle body 22 at opposed side regions. Second bar 26 is attached to the second set of spring assemblies 36. Any of the springs described herein may be suitable for the second set of spring assemblies 36. Without being bound to any theory, it is believed that this set of spring assemblies 36 may advantageously provide stowing-effort-reducing-torque to the link mechanism 20. It is to be understood that the second set of spring assemblies 36 generally assists in raising the tailgate 10 from the second open position P3 to the first open position P2 or to the closed position P1.

An alternate, non-limiting embodiment of a spring assembly is shown in FIGS. 9A and 9B and is designated generally as 33. It is to be understood that spring assembly 33 may be used as either spring assemblies 34 and/or spring assemblies 36. Spring assembly 33 includes a cylinder/thick walled tube 64 having a torsion spring 62 operatively connected thereto. The cylinder 64/spring 62 assembly is operatively connected to a flange 66 having a journal bearing 78 thereon. A key member 72 extends outwardly from the spring assembly 33. Various fastening means may be included with the spring assembly 33, including but not limited to bolts 68 receivable within throughbores 70 in flange 66. The key member 72 may be cooperatively received within a key slot 74 defined in the inside end region 23 of the body cargo area 25 (if the spring assembly is used as the second set of spring assemblies 36); and/or within a key slot 74 defined in the third bar 28 (if the spring assembly is used as the first set of spring assemblies 34). It is to be understood that the key member 72/key slot 74 configuration may be reversed (i.e. the key member 72 on bar 28/end region 23, and the key slot 74 in the spring assembly 33), as desired. A suitable fastening means, a non-limiting example of which is bolt 76, may be used to operatively attach the bar 28/end region 23 to the spring assembly 33. It is to be understood that spring assembly 33 may be operatively retained by any suitable means. In a non-limiting embodiment, a spring-locking pin (not shown) may be installed in throughbore 65. The spring-locking pin may be any suitable pin, including but not limited to a roll pin, clevis pin, taper pin, and/or the like. Referring now to FIG. 9B, the directional arrow R shows the working direction of the spring assembly 33.

Embodiment(s) of the tailgate 10 may also include two or more attaching means/cables 38 (shown schematically in the Figures) attached to the vehicle 100 by any suitable attachment mechanism. The cables 38 are adapted to operatively attach the vehicle 100 to the link mechanism 20 and to the tailgate 10. It is to be understood that the cables 38 may support a predetermined weight (e.g. human and/or animal weight in addition to the tailgate 10 weight). It is to be further understood that when the tailgate 10 is being moved into the closed position P1, the cable(s) 38 may self-fold out of the path of the tailgate 10 and/or link mechanism 20 so as to not interfere with the closing of the tailgate 20.

In an embodiment, the cables 38 are continuous and have opposed ends 37, 39. One end 37 of the cable 38 may be attached to the inside 23 of the vehicle body 22, and the other end 39 may be attached to a side region 16, 18 of the tailgate 10, towards the top region 12 of the tailgate 10. As depicted in FIG. 1, the cable(s) 38 may also be connected to the connecting means 32. In an alternate embodiment, two separate cables 35, 35' may connect the vehicle 100 to the link mechanism 20 and the link mechanism 20 to the tailgate 10.

The tailgate 10 may also include two different latch mechanisms 40, 42. The first latch mechanism 40 may be operatively defined in each of the opposed sides 16, 18 of the tailgate 10 and in respective adjacent areas in the vehicle body 22. In an embodiment, the first latch mechanism 40 is defined near the middle (although it is to be understood that mechanism 40 may be at any suitable and/or desired location) of the opposed side regions 16, 18 between the top and bottom regions 12, 14. The first latch mechanism 40 may selectively attach the tailgate 10 to the body 22 (between the closed position P1 and first open position P2). It is to be understood that this latch mechanism 40 may be a latch 41/latch pin 41' mechanism that is locked/latched and unlocked/unlatched via a key and the existing tailgate door handle 50. It is to be further understood that when the user unlocks the first latch mechanism 40, the tailgate 10 may be opened to the first open position P2 using the door handle 50.

The second latch mechanism 42 may be operatively disposed in link mechanism 20, and a cooperating latch mechanism member 42' may be operatively disposed in the respective adjacent areas of the vehicle body 22. The second latch mechanism 42 is adapted to selectively allow the link mechanism 20 to articulate so as to move the tailgate 10 between the first P2 and second P3 open positions.

Figure 3:
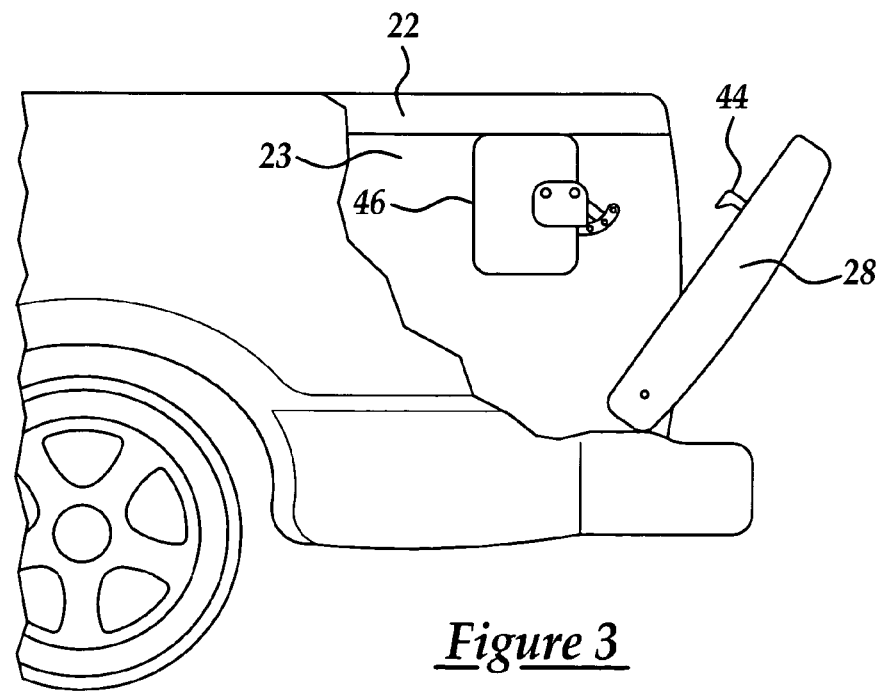
FIG. 3 is an enlarged, cutaway, semi-schematic side view of an embodiment of the double click latch.

In an embodiment, the second latch mechanism 42 includes two or more dual position touch latches. Referring now to FIG. 3, an enlarged view of a touch latch (e.g. a push—push latch) is depicted. The third bar 28 of the link mechanism 20 has a catch 44 attached thereto that is capable of being latched to, and unlatched from a push—push latch 46 located on the inside 23 of the vehicle body 22. A user may push the link mechanism 20 (third bar 28) into the push—push latch 46 to hook the catch 44 thereto. Once latched, the user may push the link mechanism 20 (third bar 28) to release the catch 44 from the latch 46. This would release the link mechanism 20, thus releasing the tailgate 10 into the second open position P3.

Figure 4:
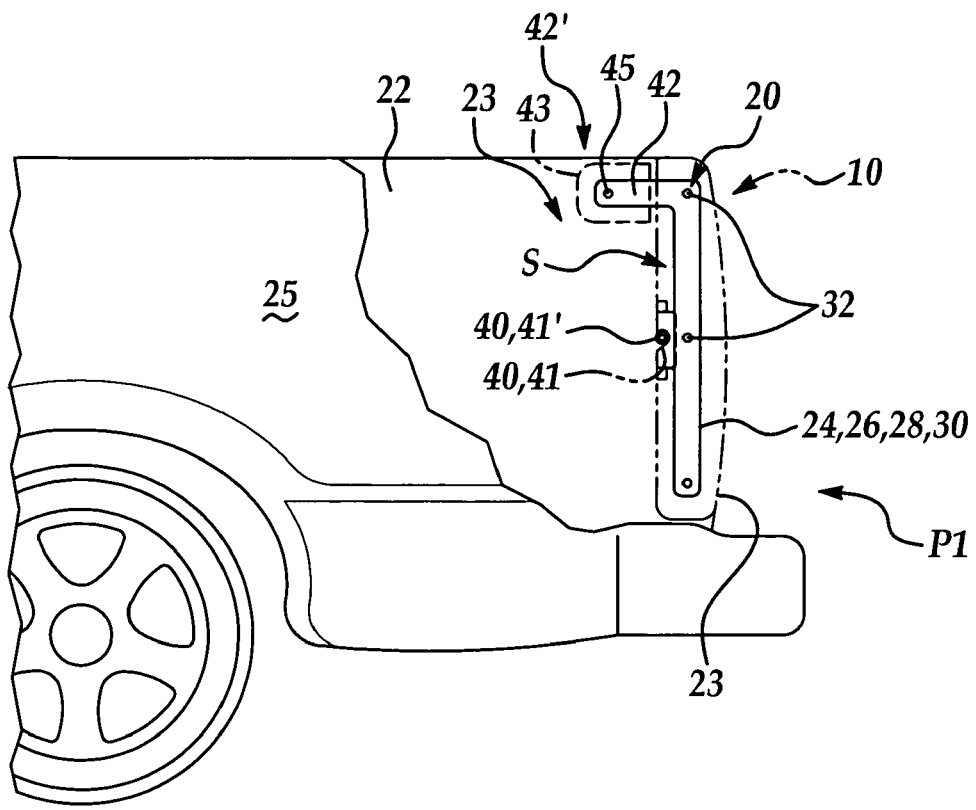
FIG. 4 is a cutaway, semi-schematic side view of an embodiment of the tailgate (shown in phantom) in the closed position.

It is to be understood that the second latch mechanism 42 may also include as the cooperating latch mechanism member 42' a hairpin cotter pin, a positive locking pin, a spring pin, and/or a clevis pin (the pin is schematically shown at reference numeral 45 in FIGS. 4 and 5) with associated anchor brackets 43 (shown schematically in phantom in FIGS. 4 and 5). When a pin mechanism is used as the second latch mechanism 42, the user removes the pins, generally from inside the cargo area 25, to release the link mechanism 20 and thus the tailgate 10 into the second open position P3. It is to be understood that if any of the pin mechanisms are used, the vehicle 100 may include a lanyard (not shown) for holding the pins 45 while the link mechanism 20 is in the extended position E.

Figure 1A:
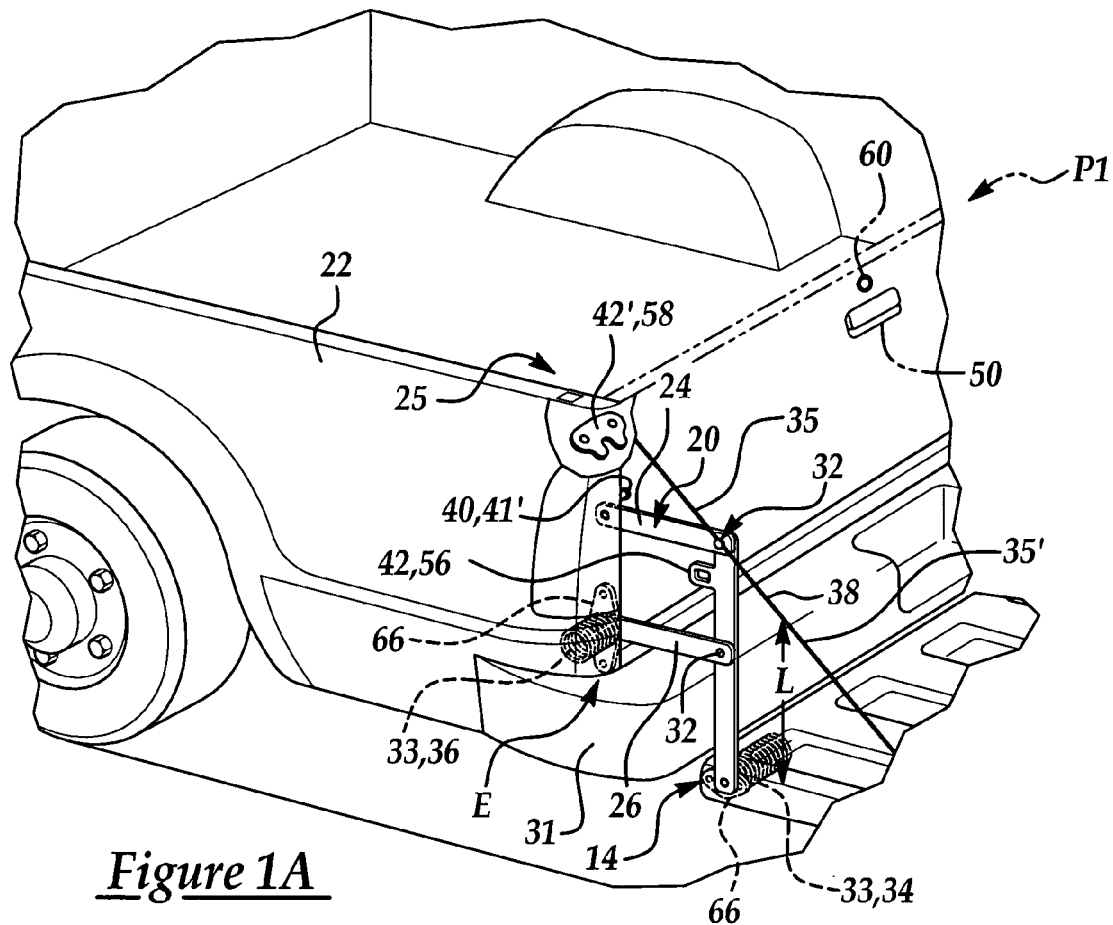
FIG. 1A is an enlarged, cutaway, semi-schematic perspective view of an alternate embodiment of the vehicle and the tailgate.
Figure 7:
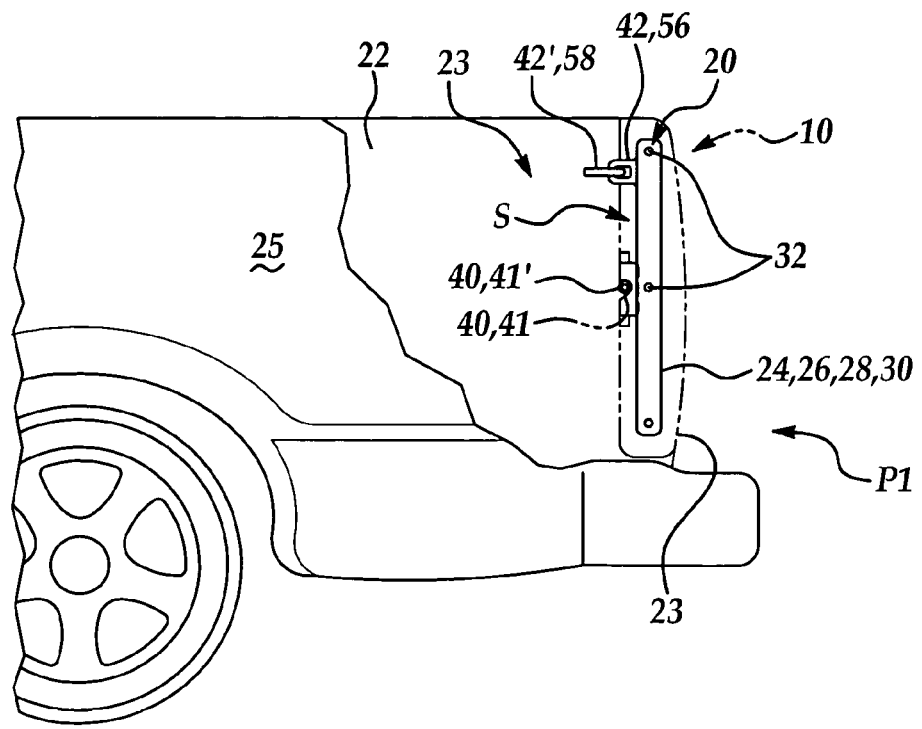
FIG. 7 is a cutaway, semi-schematic side view of an alternate embodiment of the tailgate (shown in phantom) in the closed position.

An alternate embodiment of the second latch mechanism 42 (and/or the latch mechanism member 42') is shown in FIGS. 1A, 7 and 8. This alternate embodiment includes a power latch catch 56 operatively defined in the link mechanism 20 (e.g. operatively disposed on bar 28); and a power latch 58 operatively disposed on the vehicle 100. The power latch 58 may be released from the power latch catch 56 by a link power button 60, in order to release the link mechanism 20 to its extended position E.

It is to be understood that various embodiments of the second latch mechanism 42 may be operable by the link power button 60, as desired.

Referring now to FIG. 4, the tailgate 10 is shown in the closed position P1, and the link mechanism 20 is shown in the stowed position S. As described herein, in the stowed position S, the link mechanism 20 is folded in such a manner that the bars 24, 26, 28, 30 (when used) substantially line up with each other to fit and lock into the inside 23 of the vehicle body 22 via second latch mechanism 42 (shown as a pin lock mechanism).

Referring now to FIG. 5, the tailgate 10 is shown in the first open position P2. As depicted, the first latch mechanism 40 is detached so that the tailgate 10 moves, but the second latch mechanism 42 remains locked so that the link mechanism 20 remains in the stowed position S. The first open position P2 is adapted to allow the user to gain access to the cargo area 25 of the vehicle 100.

Referring now to FIG. 6, the link mechanism 20, shown in the extended position E, includes the fourth bar 30. In an embodiment including the fourth bar 30, it is to be understood that the first and second bars 24, 26, respectively, are operatively connected to the fourth bar 30 via connecting means 32 (e.g. step pins). The connecting means 32 allow the bars 24, 26 to pivot and rotate in order to articulate the link mechanism 20 between the stowed S and extended E positions. In an embodiment, the first and second bars 24, 26 are attached such that they are substantially parallel to each other a spaced distance apart when in the extended position. Further, the third and fourth bars 28, 30 are attached to the first and second bars 24, 26 such that they are also substantially parallel to each other at a spaced distance when in the extended position E.

It is to be understood that when the link mechanism 20 is in the extended position, generally the tailgate 10 is in the second open position P3. The second open position P3 may be any desired vertical distance L lower to the ground than is the tailgate in the first open position P2 so as to be adapted to assist a user or animal in gaining access to the cargo area 25 of the vehicle 10. In an embodiment, distance L is about 12 inches.

In an alternate embodiment, it is to be understood that the link mechanism 20 may optionally include an additional latch mechanism (not shown) that would operatively connect the tailgate 10 (in an upright, "closed" position) to the link mechanism 20 even when the link mechanism 20 is in the extended position E.

In a further alternate embodiment as depicted in FIG. 6, a member 48 is operatively attached to the fourth bar 30 and/or the second bar 26 of the link mechanism 20 and to an extension spring 52. This member 48/spring 52 may also advantageously be used to provide stowing-effort-reducing-torque to the link mechanism 20 during moving of the tailgate 10 from its second open position P3 to its first open position P2.

In a further alternate embodiment, the vehicle body 22 may be designed to include an aesthetically pleasing groove (s) 54 for storing link mechanism 20 when in the stowed position S, and/or for storing link mechanism 20 substantially out of sight when in the stowed position S.

While several embodiments have been described in detail, it will be apparent to those skilled in the art that the disclosed embodiments may be modified. Therefore, the foregoing description is to be considered exemplary rather than limiting.

What is claimed:

1. A multi-purpose tailgate for a vehicle having a body, the tailgate having a top region, a bottom region, and opposed side regions, the tailgate comprising:

a multiple link mechanism operatively attaching the tailgate to the body, the multiple link mechanism adapted to articulate the tailgate from a closed position into a first open position and a second open position vertically spaced apart from the first open position;

a set of opposed spring assemblies operatively connecting the link mechanism to the vehicle body;

at least two opposed cables operatively attaching the vehicle to the link mechanism and to the tailgate, the cables adapted to support a predetermined weight;

a latch mechanism operatively defined in the opposed sides of the tailgate and in respective adjacent areas of the vehicle body, the latch mechanism adapted to selectively attach the tailgate to the vehicle body; and a second latch mechanism operatively disposed in the link mechanism and in respective adjacent areas of the vehicle body, the second latch mechanism adapted to selectively allow the link mechanism to articulate so as to move the tailgate between the at least two open positions;

wherein the first open position is adapted for access to a cargo area; and wherein the second open position is adapted for use as a step into the cargo area.

2. The multi-purpose tailgate as defined in claim 1 wherein the second latch mechanism comprises at least two dual position touch latches.

3. The multi-purpose tailgate as defined in claim 1 wherein the second open position is about twelve inches lower than the first open position.

4. The multi-purpose tailgate as defined in claim 1 wherein the set of opposed spring assemblies is adapted to assist in raising the tailgate from the second open position.

5. The multi-purpose tailgate as defined in claim 1, further comprising a second set of opposed spring assemblies operatively connecting the bottom region of the tailgate to the link mechanism; wherein the second set of opposed spring assemblies is adapted to assist in raising the tailgate to the closed position.

6. The multi-purpose tailgate as defined in claim 1 wherein the tailgate is the vehicle's original tailgate.

7. The multi-purpose tailgate as defined in claim 1 wherein the link mechanism is adapted to move from a stowed position to an extended position.

8. The multi-purpose tailgate as defined in claim 1 wherein the link mechanism comprises a first bar, a second bar parallel to and a spaced distance from the first bar when the tailgate is in the second open position, and a third bar operatively connected to the first and second bars, the third bar being perpendicular to both the first and second bars when the tailgate is in the second open position.

9. The multi-purpose tailgate as defined in claim 8 wherein the link mechanism further comprises a fourth bar that is parallel to and a spaced distance from the third bar and that is operatively connected to both the first and second bars.

10. The multi-purpose tailgate as defined in claim 8 wherein a first step pin operatively connects the first bar to the third bar and a second step pin operatively connects the second bar to the third bar such that the first, second, and third bars are moveable.

11. The multi-purpose tailgate as defined in claim 10 wherein each of the at least two opposed cables is operatively connected to the first step pin and is adapted to self-fold out of the way of the link mechanism and the tailgate when the tailgate is in the first open position and the closed position.

12. The multi-purpose tailgate as defined in claim 1 wherein each of the at least two opposed cables comprise separate cables between the vehicle and the link mechanism and between the link mechanism and the tailgate.

13. The multi-purpose tailgate as defined in claim 1 wherein each of the at least two cables has an end, and wherein the end of one of the at least two cables is attached to one of the opposed side regions of the tailgate near the top region and the end of another of the least two cables is attached to the other of the opposed side regions of the tailgate near the top region.

14. The multi-purpose tailgate as defined in claim 1 wherein the latch mechanism operatively defined in the opposed sides of the tailgate is located between the top region and the bottom region of the tailgate.

15. A multi-purpose tailgate for a vehicle having a body, the tailgate having a top region, a bottom region, and opposed side regions, the tailgate comprising:

at least two opposed multiple link mechanisms operatively attaching the tailgate to the body, the at least two opposed multiple link mechanisms adapted to articulate the tailgate from a closed position into a first open position and a second open position vertically spaced apart from the first open position, each of the at least two link mechanisms including:

a first bar;

a second bar parallel to and a spaced distance from the first bar when the tailgate is in the second open position; and a third bar operatively connected the first and second bars, the third bar being perpendicular to both the first and second bars when the tailgate is in the second open position;

a set of opposed spring assemblies operatively connecting the bottom region of the tailgate to the third bars of the at least two opposed link mechanisms;

a second set of opposed spring assemblies operatively connecting the second bars of the at least two link mechanisms to the vehicle body;

at least two cables operatively attaching the vehicle to each of the at least two link mechanisms and to the tailgate, the cables adapted to support a predetermined weight;

a latch mechanism operatively defined in the opposed sides of the tailgate and in respective adjacent areas of the vehicle body, the latch mechanism adapted to selectively attach the tailgate to the vehicle body; and a second latch mechanism operatively disposed in the link mechanism and in respective adjacent areas of the vehicle body, the second latch mechanism adapted to selectively allow the at least two link mechanisms to articulate so as to move the tailgate between the at least two open positions;

wherein the first open position is adapted for access to a cargo area; and wherein the second open position is adapted for use as a step into the cargo area.

* * * * *